United States Patent
Ho

(10) Patent No.: US 7,272,093 B2
(45) Date of Patent: Sep. 18, 2007

(54) APPARATUS FOR CONTROLLING AN OPTICAL DISK DRIVE BY CALCULATING A TARGET FREQUENCY OF A DPLL SIGNAL

(75) Inventor: Hsu-Feng Ho, Taipei (TW)

(73) Assignee: Mediatek Inc., Hsin-Chu Hsien (TW)

(*) Notice: Subject to any disclaimer, the term of this patent is extended or adjusted under 35 U.S.C. 154(b) by 110 days.

(21) Appl. No.: 11/162,406

(22) Filed: Sep. 9, 2005

(65) Prior Publication Data

US 2006/0002271 A1 Jan. 5, 2006

Related U.S. Application Data

(62) Division of application No. 10/064,601, filed on Jul. 30, 2002, now Pat. No. 7,145,855.

(51) Int. Cl.
*G11B 7/00* (2006.01)

(52) U.S. Cl. ............... 369/53.34; 369/47.31; 369/53.2; 369/59.19; 369/47.48

(58) Field of Classification Search ............ None
See application file for complete search history.

(56) References Cited

U.S. PATENT DOCUMENTS

| | | | |
|---|---|---|---|
| 4,618,897 A * | 10/1986 | Johnson et al. ............ 360/15 |
| 5,414,685 A * | 5/1995 | Shimizu ................ 369/47.2 |
| 5,636,192 A * | 6/1997 | Shimizume et al. ...... 369/47.28 |
| 5,745,455 A * | 4/1998 | Takeda et al. ............. 360/51 |
| 5,920,214 A | 7/1999 | Lee et al. |
| 6,285,640 B1 | 9/2001 | Hayashi et al. |

FOREIGN PATENT DOCUMENTS

| JP | P2000-163890 A | 6/2000 |
|---|---|---|
| TW | 494400 | 7/2002 |

* cited by examiner

*Primary Examiner*—William Korzuch
*Assistant Examiner*—Peter Vincent Agustin
(74) *Attorney, Agent, or Firm*—Winston Hsu

(57) ABSTRACT

A control circuit for an optical disk drive includes a frequency detector, a phase detector, a low pass filter, a voltage-controlled oscillator (VCO), and a controller. The frequency detector and the phase detector both receive an eight-to-fourteen modulation (EFM) signal and a data phase-locked loop (DPLL) signal. The controller can calculate a target frequency and control the VCO to output the DPLL signal according to the target frequency. During a non-seek mode, the VCO outputs the DPLL signal according to output of the frequency detector, phase detector, and low pass filter. During a seek mode or when spindle speed of the optical disk drive changes, the VCO outputs the DPLL signal according to the target frequency. The controller further outputs charge pump currents for the frequency detector and the phase detector and sets an RF equalizer signal and a differential phase detector (DPD) equalizer signal according to the target frequency.

8 Claims, 3 Drawing Sheets

APPARATUS FOR CONTROLLING AN OPTICAL DISK DRIVE BY CALCULATING A TARGET FREQUENCY OF A DPLL SIGNAL

CROSS REFERENCE TO RELATED APPLICATIONS

This is a division of application Ser. No. 10/064,601, filed Jul. 30, 2002 now U.S. Pat. No. 7,145,855, from which the specification and drawings are carried forward without amendment.

BACKGROUND OF THE INVENTION

1. Field of the Invention

The present invention relates to an optical disk drive, and more specifically, to a control circuit and method for controlling an optical disk drive.

2. Description of the Prior Art

Optical disk drives such as compact disk (CD) drives and digital versatile disk (DVD) drives are widely used storage devices. Aside from audio and video information CDs and DVDs are commonly used to store computer software and other data.

Essentially, both CD and DVD disks comprise a spiral track from which data can be read by an optical pickup head of the CD or DVD drive. During a read mode, the optical pickup head is controlled to follow the spiral groove to sequentially read data from the disk. During a seek mode, when a track or frame seek function is executed, drive electronics control the optical pickup head to move to a new frame or new track of the disk.

According to the prior art, the drive electronics reference tabulated positional data and must further decode data stored in frames of the CD or DVD disk, such as subcode data, in order to adjust the position of the optical pickup head. While the optical pickup head changes tracks, a phase-locked loop monitors an eight-to-fourteen modulation (EFM) signal to control the rotational speed of the disk. In other words, during the seek function, the optical pickup head is moved across the surface of the disk to a new location and the phase-locked loop responds accordingly. Slow response of the phase-locked loop results in the time and processing overhead required for performing the seek function becoming high enough to affect overall seek time and performance of the CD or DVD drive.

In many cases, such as high-speed (32x–48x+) CD-ROM drives, a limiting factor in drive data read rate is data seek time. This is further apparent in non-sequential or random access of the frames of a CD-ROM disk. The high-speed potential of the CD-ROM drive is negated by a longer than necessary seek time, and the drive spends much of its operational time delivering data at rates more in line with low-speed drives (8x–16x). This problem also exists in other types of CD and DVD drives to varying degrees, and typically, additional time and processing overhead is required to overcome it.

Please refer to FIG. 1. FIG. 1 shows a phase-locked loop 10 for controlling a CD or DVD drive according to the prior art. A frequency detector 12 and a phase detector 14 receive an EFM signal and a data phase-locked loop (DPLL) signal. A filter 16 accepts error signals output from the frequency detector 12 and the phase detector 14. The filter 16 outputs a control signal to a voltage-controlled oscillator (VCO) 18 that produces a corresponding oscillating signal at a frequency relating to the input control signal. A frequency divider 20 divides the oscillating signal and outputs the DPLL signal to the frequency detector 12 and the phase detector 14. The phase-locked loop 10 locks onto a component frequency of the EFM signal to regenerate a clock signal to facilitate synchronized reading of data from the optical disk as described above. This type of optical drive control circuit is well known in the art and can suffer from slow response and long stabilization time.

Therefore, prior art optical disk drives, such as CD and DVD drives, have phase locked-loop control circuits and control methods that do not provide adequate seek times. Furthermore, the stabilization time of the prior art control circuit is too long during the seek mode or during a time when a spindle rotation speed of the optical disk drive changes.

SUMMARY OF THE INVENTION

It is therefore a primary objective of the present invention to provide an optical disk drive control circuit and method that can calculate a target frequency for a data phase-locked loop (DPLL) signal to solve the problems of the prior art.

Briefly summarized, a preferred embodiment of the present invention includes a frequency detector and a phase detector both for receiving an eight-to-fourteen modulation (EFM) signal and a data phase-locked loop (DPLL) signal. A low pass filter receives output from the frequency detector and the phase detector and outputs a corresponding first control signal. A voltage-controlled oscillator (VCO) is provided connected to the low pass filter. The VCO receives the first control signal and outputs the DPLL signal accordingly. Further provided is a controller that monitors the DPLL signal and outputs a second control signal to the VCO. The controller is capable of calculating a target frequency and outputs the second control signal to the VCO to cause the VCO to output the DPLL signal according to the target frequency.

According to a preferred embodiment of the present invention, during a non-seek mode, the VCO outputs the DPLL signal according to the first control signal. Moreover, during a seek mode, the controller calculates a target frequency and outputs the second control signal to the VCO to cause the VCO to output the DPLL signal according to the target frequency.

According to a preferred embodiment of the present invention, the controller calculates a target frequency and outputs the second control signal to the VCO to cause the VCO to output the DPLL signal according to the target frequency when a rotation speed of a spindle of the optical disk drive changes.

A method according to a preferred embodiment of the present invention monitors a DPLL signal, generates a first control signal based on the EFM signal and the DPLL signal, and, when an optical disk drive is in a non-seek mode, generates the DPLL signal based on the first control signal. The method further calculates a target frequency, generates a second control signal based on the target frequency, and, when the optical disk drive is in a seek mode, generates the DPLL signal based on the second control signal.

It is an advantage of the present invention that the controller calculates a target frequency for the DPLL signal during the seek mode thus reducing overall seek time.

It is an advantage of the present invention that the controller calculates a target frequency for the DPLL signal when a rotation speed of the spindle of the optical disk drive changes.

These and other objectives of the present invention will no doubt become obvious to those of ordinary skill in the art

DETAILED DESCRIPTION

The present invention applies to optical disk drives such as compact disk (CD) drives and digital versatile disk (DVD) drives. Currently, there are a large number of applications of these drives such as CD-ROM, CD-RW, and DVD+RW to name just a few.

Figure 1:
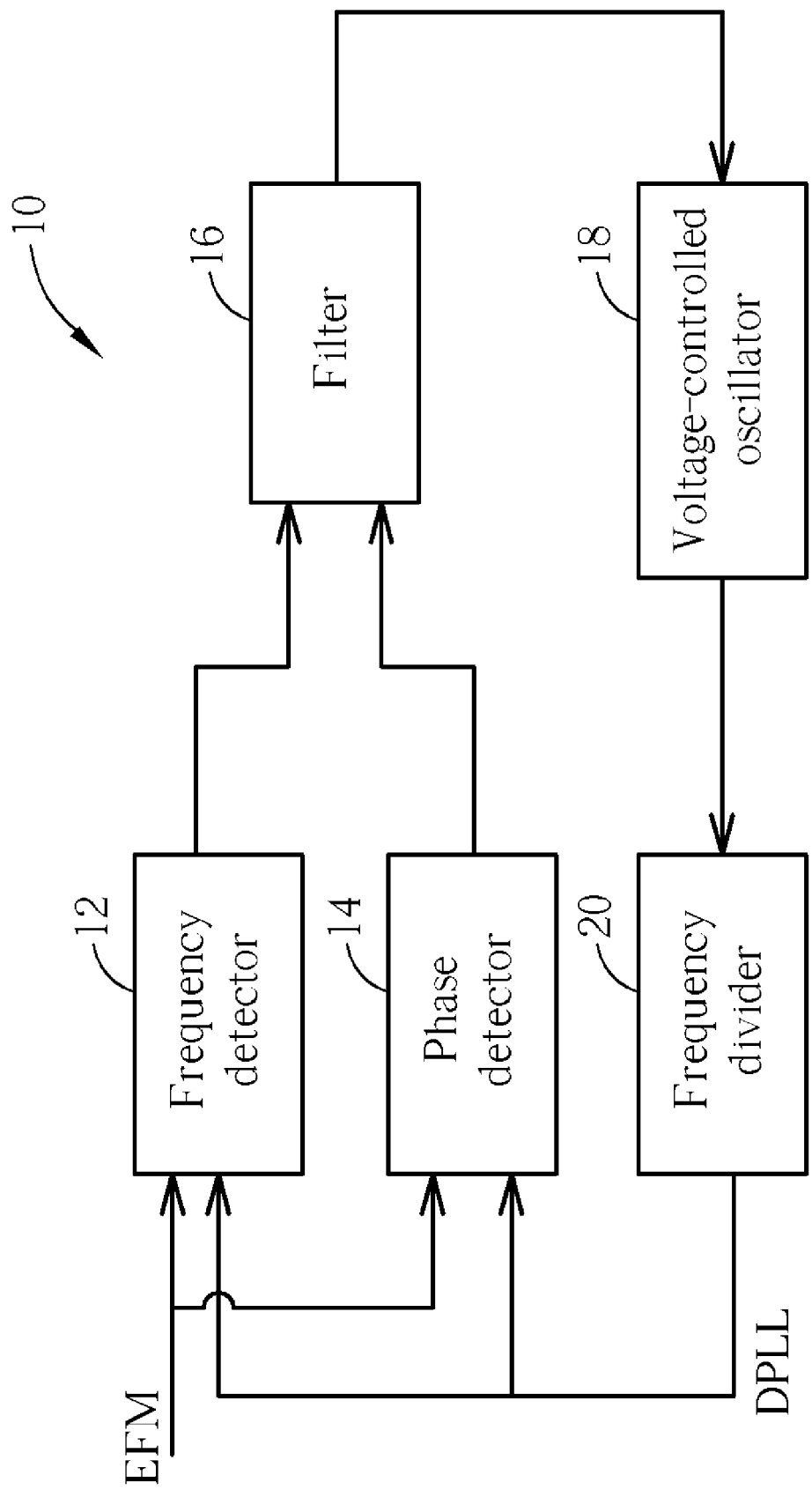
FIG. 1 is a block diagram of a phase-locked loop for controlling an optical disk drive according to the prior art.
Figure 2:
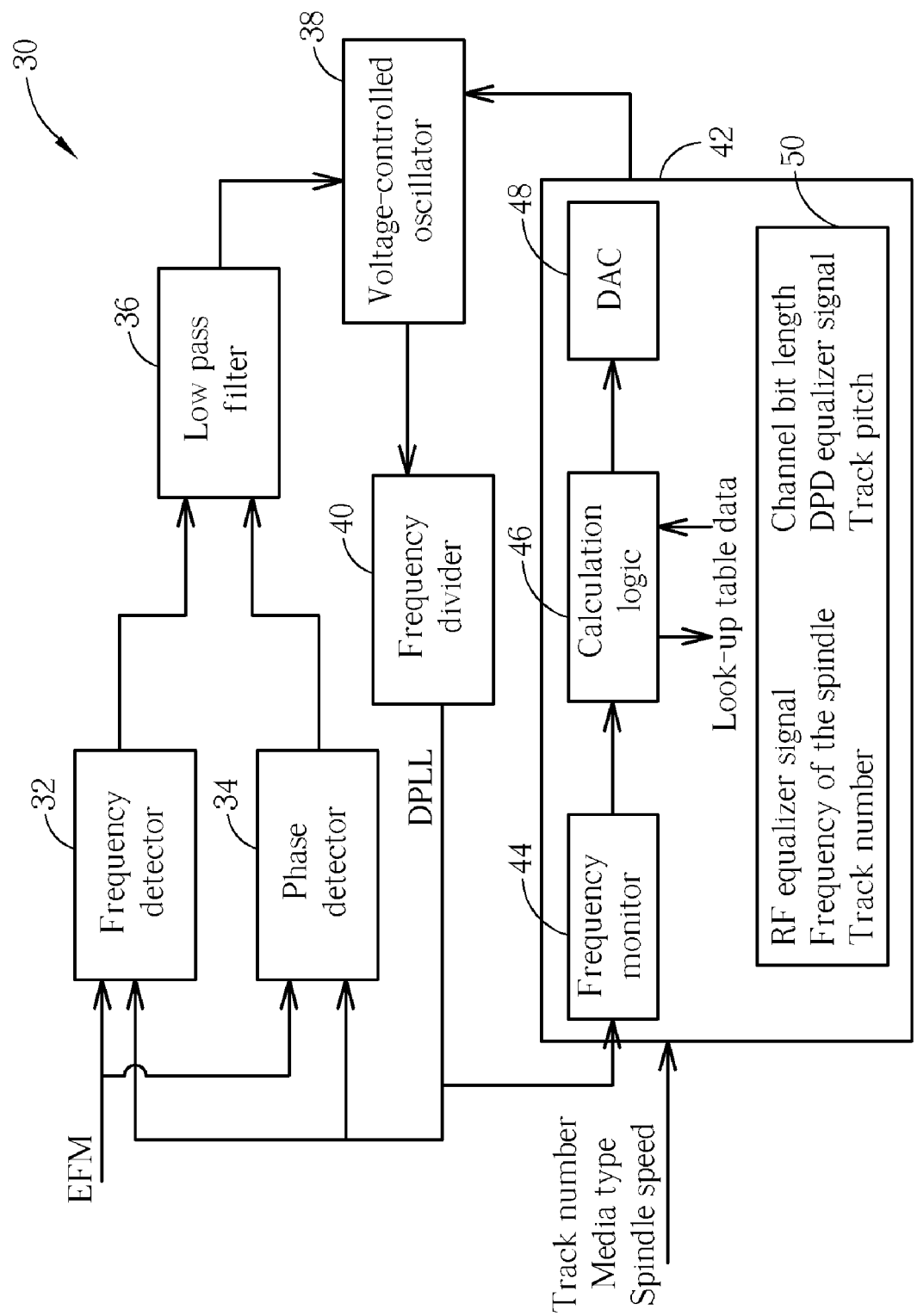
FIG. 2 is a block diagram of a control circuit for controlling an optical disk drive according to a preferred embodiment of the present invention.

Please refer to FIG. 2. FIG. 2 shows a block diagram of a control circuit 30 according to a preferred embodiment of the present invention. The control circuit 30 includes a frequency detector 32 and a phase detector 34 having outputs connected to a low pass filter 36. An output of low pass filter 36 is connected to a voltage-controlled oscillator (VCO) 38. The VCO 38 has an output connected to a frequency divider 40, which is connected to inputs of the frequency detector 32 and the phase detector 34. The VCO 38 is capable of receiving multiple signals and switching or otherwise selecting between these signals. The control circuit 30 further includes a controller 42 connected to the output of the frequency divider 40. An output of the controller 42 is connected to a second input of the VCO 38. The controller 42 comprises a frequency monitor 44, calculation logic 46, and a digital-to-analog converter (DAC) 48. Input to the controller 42 is first received by the frequency monitor 44. An output of the frequency monitor 44 is connected to the calculation logic 46. Output of the calculation logic 46 goes to the DAC 48, and output of the DAC 48 becomes output of the controller 42.

The frequency detector 32 and the phase detector 34 receive an eight-to-fourteen modulation (EFM) signal and a data phase-locked loop (DPLL) feedback signal as illustrated in FIG. 2. The EFM signal is supplied to the frequency detector 32 and the phase detector 34 from an optical pickup head that reads an optical disk. The frequency detector 32 and the phase detector 34 compare the EFM signal and the DPLL signal and output corresponding error signals as is well known in the art. The low pass filter 36 receives the outputs of the frequency detector 32 and the phase detector 34 and outputs a corresponding first control signal. The VCO 38 receives the first control signal and accordingly generates the DPLL signal. The DPLL signal is input as a feedback signal to the frequency detector 32 and the phase detector 34 after first being frequency divided by the frequency divider 40. The control circuit 30 as described thus far can lock onto a component frequency of the EFM signal to regenerate a clock signal to facilitate synchronized reading of data from the optical disk.

The frequency monitor 44 of the controller 42 also receives the DPLL signal output from the frequency divider 40. The frequency monitor 44 monitors the DPLL signal. The calculation logic 46, being a small processor or similar logic circuit, calculates a target frequency and output the target frequency to the DAC 48. The DAC 48 then converts the digitally encoded target frequency to an analog second control signal that is sent by the controller 42 to the VCO 38.

The control circuit 30 has several modes of operation, two of which being a non-seek mode and a seek mode. During the non-seek mode, the CD or DVD drive is typically reading data from the surface of the disk. Depending on the operating principle of the drive a spindle spins the disk with a constant angular velocity (CAV), a constant linear velocity (CLV), or some combination of CAV and CLV. Regardless of the operating principle of the drive, during the non-seek mode the input to the VCO 38 is set to the first control signal output from the low pass filter 36. The control circuit 30 then locks onto the clock frequency component of the EFM signal, thus facilitating correct rotation speed of the spindle and disk.

During the seek mode, the optical pickup head of the optical drive must traverse the disk to a new track, a track being a nearly circular concentric segment of a spiral groove of the optical disk. The seek mode can be initiated in many different ways such as a user button press, a command from a computer, or others. Accordingly, the calculation logic 46 of the controller 42 determines a target frequency of the DPLL signal corresponding to the new track and outputs the target frequency to the DAC 48 to cause the DAC 48 to output the second control signal to the VCO 38. The second control signal then causes the VCO 38 to generate the DPLL signal at the target frequency.

The calculation logic 46 determines the target frequency as follows:

$$f_{DPLL} = \frac{2\pi R f_{spindle}}{C} \quad \text{(Eqn. 1)}$$

where, $f_{DPLL}$ is the frequency of the DPLL signal, the target frequency to be set as determined absolutely;

R is an absolute radius of the seeked track measured from the center of the disk;

$f_{spindle}$ is a rotational frequency of the spindle;

C is a channel bit length of media on the disk;

Thus, the target frequency can be set depending on the rotational speed or frequency of the spindle, the radius of the new track, and the channel bit length. The radius of the track depends on a track number (i.e. where the track is with respect to the center of the disk) and track pitch, and the track pitch depends on the type of disk. The channel bit length also depends on the type of disk. For a typical CD, as an example, the track pitch is 0.833 μm and the channel bit length is dependent on the pitch length of 1.6 μm. The controller 42 determines specifically what type of disk is in the drive, and sets these parameters accordingly. Additionally, the controller 42 monitors the track number and the rotational speed or frequency of the spindle.

Moreover, a change in track number becomes a change in the DPLL frequency. The calculation logic 46 of the controller 42 can determine the target frequency by determining a change in track number and the resulting change in DPLL frequency as follows:

$$\Delta f_{DPLL} = \frac{2\pi \Delta T \, p \, f_{spindle}}{C} \quad \text{(Eqns. 2)}$$

$$f_{target} = f_0 \pm \Delta f_{DPLL}$$

where, $\Delta f_{DPLL}$ is a change in the frequency of the DPLL signal;

T is a change in track number, or the distance in tracks to the track that is being seeked, a track being one of a plurality of concentric rings of the spiral groove on the disk;

p is a track pitch, the spacing between the tracks;

$f_{target}$ is the desired target frequency for the DPLL signal;

$f_0$ is the current DPLL frequency;

The change in the DPLL frequency is added to or subtracted from the current DPLL frequency by the controller 42, depending on the direction of the track seek (towards the outer edge of the disk or towards the center) to determine the target frequency.

Thus in either of the two approaches described above, the controller 42, using the calculation logic 46, determines the target frequency for the DPLL signal. The controller 42 then outputs the second control signal from the DAC 48 to the VCO 38 to generate the DPLL signal at the target frequency. In practical application, the second control signal can be retrieved from a look-up table 50, which can be stored in the controller 42, by referencing the target frequency.

During the seek mode the controller 42 sets charge pump currents of the frequency detector 32 and the phase detector 34 according to the target frequency to adjust the response time of the control circuit 30. When the charge pump currents are increased, response of the control circuit 30 is relatively fast. When the charge pump currents are decreased, response of the control circuit 30 is slower. The controller 42 also sets an RF equalizer signal and a differential phase detector (DPD) equalizer signal, both of which are used to filter signals coming from the optical pickup head, according to the target frequency. In practical application, the RF equalizer signal and the DPD equalizer signal can also be retrieved from a look-up table 50, which can be stored in the controller 42, by referencing the target frequency.

The controller 42 further detects when the spindle speed of the optical drive changes and when the DPLL frequency must accordingly change. The spindle speed can change when, for example, the optical pickup head enters a zone of the disk to be read at a different spindle rotation speed, such as in the case of a disk partitioned into a plurality of CAV zones. This can also occur if controlled externally by a user or a computer. The controller 42 detects when the spindle speed changes and accordingly generates the second control signal as described above for the seek mode.

Figure 3:
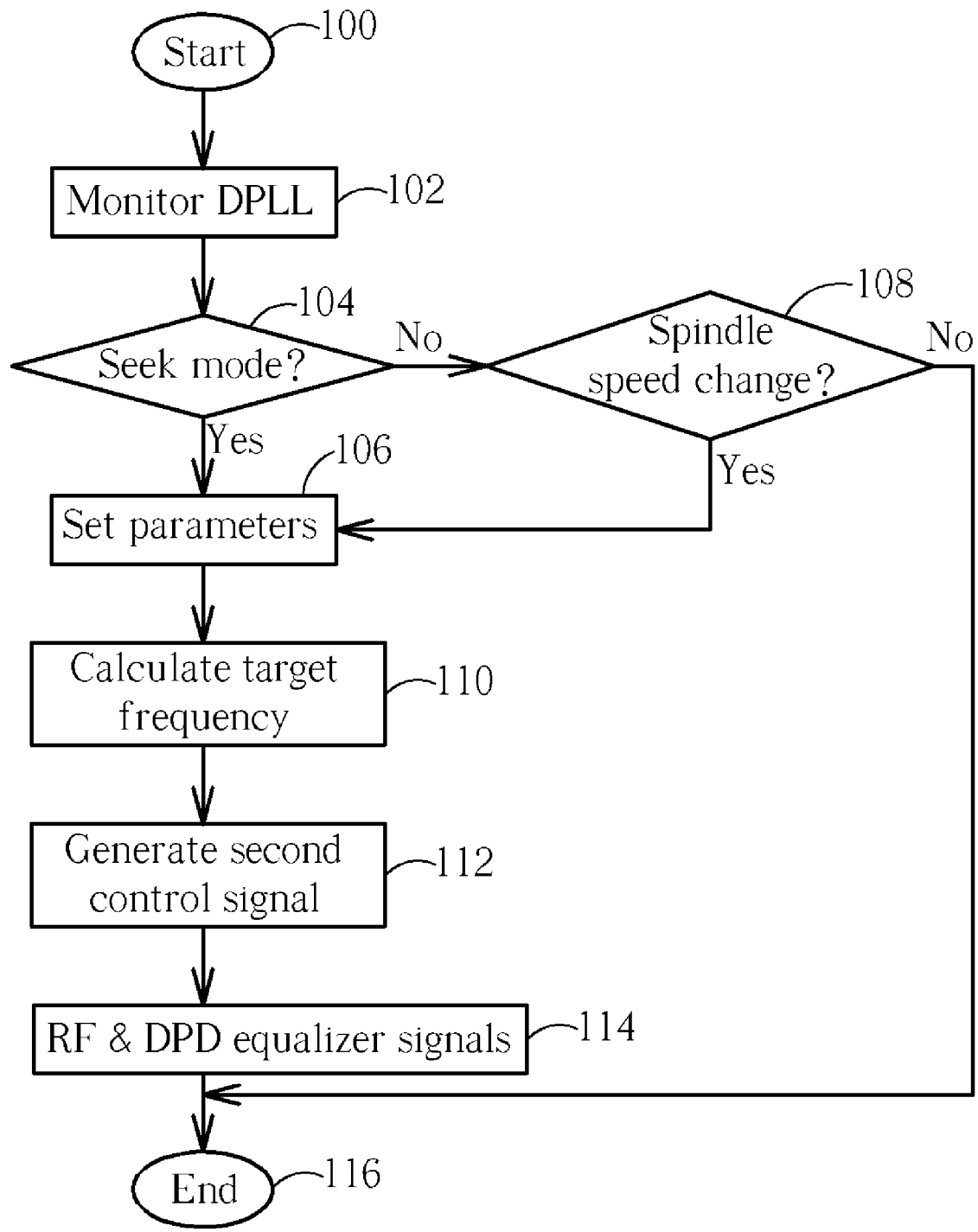
FIG. 3 is a flowchart of an operation of a preferred embodiment of the present invention.

Please refer to FIG. 3. FIG. 3 is a flowchart illustrating an operation of the present invention according to a preferred embodiment. The flowchart of FIG. 3 is described as follows:

Step 100: Start;

Step 102: The controller 42 monitors the DPLL signal frequency. The VCO 38 is operating based on the first control signal input from the low pass filter 36;

Step 104: The controller 42 determines if the optical disk drive is in the seek mode. Has the seek mode been initiated by a user, or a command from a computer, or other source? If the seek mode has been initiated go to step 106. If the seek mode has not been initiated go to step 108;

Step 106: The controller 42 sets or retrieves the values of optical drive operation parameters such as the frequency of the spindle and the seeked track number, and media dependant parameters such as channel bit length and track pitch;

Step 108: The controller 42 determines if the rotational speed of the spindle is changing. Is the spindle speed changing? If it is changing, go to step 106. If not, go to step 116;

Step 110: The calculation logic 46 of the controller 42 calculates a target frequency for the DPLL as previously described;

Step 112: The DAC 48 of the controller 42 generates the second control signal based on the calculated target frequency. The controller 42 outputs the second control signal to the VCO 38;

Step 114: The controller 42 sets other outputs such as the charge pump currents of the frequency detector 32 and the phase detector 34, and the RF equalizer signal and the DPD equalizer signal according to the calculated target frequency;

Step 116: End.

The procedure described above determines which mode the control circuit 30 is in and whether or not the spindle rotation speed is changing. If the optical drive is neither in the seek mode nor changing the spindle rotation speed, then the control circuit 30 operates in the previously described non-seek mode.

In practical application, the present invention control circuit 30 and method can be implemented with standard electronic components. In the preferred embodiment described, the VCO 38 includes a switch that can be set to select which input signal, the first or second control signal, the VCO 38 generates the DPLL signal based on. This switch can be of many types and that can be indirectly or directly controlled by the controller 42. Furthermore, the low pass filter 36 could be replaced with another type of suitable filter such as a loop filter.

In contrast to the prior art, the present invention has a controller that calculates a target frequency during a seek mode or when a spindle rotation speed changes. The controller references optical drive operation parameters such as a frequency of a spindle and a track number, and media dependant parameters such as channel bit length and track pitch. The calculated target frequency is converted into a second control signal by the controller to drive a voltage-controlled oscillator to output a DPLL signal. Moreover, the controller outputs charge pump currents to a frequency detector and a phase detector, and an RF equalizer signal and a DPD equalizer signal according to the calculated target frequency. The present invention control circuit offers a shorter seek time and quicker stabilization than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for controlling an optical disk drive, the control circuit comprising:

a frequency detector for receiving an eight-to-fourteen modulation (EFM) signal and a data phase-locked loop (DPLL) signal;

a phase detector for receiving the EFM signal and the DPLL signal;

a low pass filter connected to the frequency detector and the phase detector for receiving outputs from the frequency detector and the phase detector and for outputting a first control signal;

a voltage-controlled oscillator (VCO) connected to the low pass filter for receiving the first control signal and for outputting the DPLL signal; and a controller for monitoring the DPLL signal and for outputting a second control signal to the VCO;

wherein the controller is capable of calculating a target frequency and outputs the second control signal to the VCO to cause the VCO to output the DPLL signal according to the target frequency; and the controller determines the target frequency by referencing a track number and a media type.

2. The control circuit of claim 1 wherein during a non-seek mode, the VCO outputs the DPLL signal according to the first control signal; and during a seek mode, the controller calculates a target frequency and outputs the second control signal to the VCO to cause the VCO to output the DPLL signal according to the target frequency.

3. The control circuit of claim 1 wherein the controller calculates a target frequency and outputs the second control signal to the VCO to cause the VCO to output the DPLL signal according to the target frequency when a rotation speed of a spindle of the optical disk drive changes.

4. The control circuit of claim 1 wherein the controller comprises:

a digital-to-analog converter connected to the VCO for outputting the second control signal; and a frequency monitor for monitoring the DPLL signal.

5. The control circuit of claim 1 further comprising a frequency divider connected to the VCO for dividing a frequency of the DPLL signal.

6. The control circuit of claim 1 wherein the controller further sets charge pump currents of the frequency detector and the phase detector according to the target frequency.

7. The control circuit of claim 1 wherein the optical disk drive operates in a constant angular velocity mode.

8. The control circuit of claim 1 being incorporated in a compact disk (CD) drive or a digital versatile disk (DVD) drive.

* * * * *